Patented May 27, 1947

2,421,207

UNITED STATES PATENT OFFICE 2,421,207

METHOD OF MANUFACTURING LUMINESCENT SULFIDES AND SELENIDES

Humboldt W. Leverenz, South Orange, N. J., assignor to Radio Corporation of America, a corporation of Delaware No Drawing. Application January 26, 1942, Serial No. 428,228

5 Claims. (Cl. 252—301.6)

My invention relates to the preparation and production of free-flowing non-flocculent sulphide and selenide luminescent materials or phosphors in finely divided crystalline form.

Various luminescent materials of the sulphide, seleno-sulphide, selenide and sulpho-selenide types when made by conventional crystallizing processes are naturally flocculent and tend to aggregate and form loose clusters of particles. Such materials are difficult to use in the form of screens or layers, such as in electric discharge devices or for use as a pigment in paints where thin uniform layers are desired, as they are not free-flowing unless the individual crystals or particles are coated with an inert material such as alumina, silica or sulphur so that the particles will slide on each other and prevent the formation of flocculent aggregates. The coating on the crystal particles which renders the material free-flowing causes a considerable and objectionable loss in luminescent efficiency where a layer of phosphor is to be used in electric discharge devices, such as in cathode ray tubes, in which case the electron energy must be increased to penetrate the inert coating.

It is an object of my invention to provide a phosphor of the sulphide- or selenide-containing type having high luminous efficiency and capable of developing efficient luminescence a low electron excitation velocities. It is another object of my invention to provide a non-flucculent free-flowing crystalline phosphor material of the type described which is substantially free of aggregates and consists only of highly luminescent material. It is still another object of my invention to provide a substantially non-flocculent free-flowing phosphor material consisting of uncoated sulphide, seleno-sulphide, sulpho-selenide or selenide crystals.

In accordance with my invention I provide a free-flowing non-flocculent mass of sulphide, seleno-sulphide, selenide or sulpho-selenide crystals with no extraneous inert matter contaminating the surface of the individual crystals, thereby increasing the luminescent efficiency of the phosphor. More particularly in accordance with my invention I process the crystallized material so that the crystals are rendered free-flowing and substantially non-flocculent, preferably by washing the small crystals of a sulphide, seleno-sulphide, selenide or sulpho-selenide phosphor in an aqueous solution containing ionized elements of one or more of the phosphor constituents. Thus, in accordance with one aspect of my invention, I wash the crystallized sulphide particles with an aqueous solution of hydrogen sulphide to limit or prevent the formation of and free the particles from inert contaminating substances.

As an example of one method of preparing my improved phosphors I will refer to a zinc sulphide phosphor activated with silver, although two or more activators such as silver and copper may be used in accordance with my copending application, Serial No. 412,687, filed September 27, 1941. To prepare this phosphor, 500 grams (g.) of "luminescence-pure" zinc sulphide is moistened with an aqueous solution containing 0.1 g. of silver as a soluble salt; 0.05 g. of copper as a soluble salt, if a second activator is desired; 15 g. of sodium or potassium chloride as a flux, and, if the material is to be used in cathode ray tubes, 10 g. of barium chloride as a secondary electron emission intensifier. During the preparation of the raw materials some contamination of the desired raw materials may occur, although such contamination should be held to a strict minimum especially with respect to active agents which affect the spectral characteristics or efficiency of the resulting phosphor. The wet mass is well mixed and stirred to dryness under an infra red lamp or over a water bath, powdered, placed in a clean quartz crucible, and heated or fired in a clean electric furnace to a temperature above 700° C. and preferably within the range of 1200–1300° C.

Following firing and in accordance with my invention, the resultant mass is vigorously washed, preferably by mechanical stirring and/or agitation, in alternate washings of hot doubly distilled water and hot doubly distilled water saturated with or containing considerable hydrogen sulphide. The hydrogen sulphide water for the alternate washings is preferably prepared by saturating the water with hydrogen sulphide at room or low temperature, the water being warmed only after being poured over the phosphor. The alternate washings are usually continued four or more times until the chloride or other fluxing content of the wash water is negligible. The material is then dried and is ready for use, or the material may be placed in a clean ball mill, preferably in an aqueous solution containing hydrogen sulphide, and rolled with Pyrex balls merely to break the more recalcitrant residual aggregates without materially reducing the average particle size of the individual sulphide crystals.

The dried material, ready for use, may be applied as cathode ray tube screens or may be used for coatings in luminescent lamps or wherever thin uniform layers of the material are desired, the preparation of such layers being greatly facilitated by the non-flocculent and free-flowing nature of the material. This process is not limited to use with small phosphor crystals but is equally applicable to the largest producible crystals where freedom from inert matter on the crystal surfaces is desired. Obviously, my material may be mixed with any other phosphor material to provide mixed materials having wide spectral emission ranges.

The preparation of the phosphor need not be restricted to the exact process described but may employ different fluxes such as ammonium chloride, sodium bromide, hydrogen bromide, magnesium chloride or others in addition to or in place of the sodium or potassium chloride referred to above, the alternate washings preferably being continued until the fluxing content is reduced to less than 0.001 percent by weight of the wash water. Similarly, the crystallization temperature upon firing may be varied over a wide range such as from 700° C. to 1600° C. depending upon the time of heating and the pressure which may vary from 0.0001 to 50,000 times atmospheric pressure. The furnace may likewise be provided with an oxidizing, reducing or neutral atmosphere with or without the addition thereto of ammonia and water vapor to control the crystal growth and phosphorescent properties of the material. The secondary electron emitting properties of the phosphors may be improved by the addition, before or after crystallization, of elements or compounds thereof which have large atomic or ionic radii and low ionization potentials, for example, rubidium, caesium, uranium, magnesium or thorium, either in addition to or in place of the barium compound.

The above example is given with particular reference to a zinc sulphide phosphor, although my process is equally applicable to luminescent sulphides of other metals or mixed sulphides, such as zinc-cadmium sulphides. Furthermore, any metal selected from the group of metals consisting of manganese, beryllium and cadmium may be substituted in whole or in part for the zinc in a mono- or bi-metal sulphide or in whole or in part for the zinc or cadmium in a multimetal sulphide. Furthermore, selenium may be used either in whole or in part to replace the sulphur. When selenium is substituted in whole for the sulphur, the beneficial effects are obtained by washing the crystallized product in an aqueous solution of hydrogen selenide, while in the case of a partial substitution of selenium for sulphur the crystallized phosphor is washed in an aqueous solution of hydrogen sulphide and hydrogen selenide. Thus in manufacturing selenides I use hydrogen selenide washing solutions, and in the case of sulpho-selenides or seleno-sulphides I use a washing solution containing both hydrogen sulphide and hydrogen selenide. The water containing the hydrogen sulphide and/or hydrogen selenide may be hot or cold but I have found that hot water is apparently preferable. Furthermore, the water may be saturated or be less than saturated with hydrogen sulphide or hydrogen selenide but should preferably contain at least one cubic centimeter (calculated as a gas) of hydrogen sulphide or hydrogen selenide in each 100 milliliters of water, at least during one instant of the washing process. This is an amount of hydrogen sulphide which will produce ionized products far in excess of the ionized sulphur normally produced by dissociation of the zinc sulphide. In fact, this excess in a saturated hydrogen sulphide solution at 18° C. is approximately 10,000 times greater than for normal dissociation of zinc sulphide. The sulphide, seleno-sulphide or sulpho-selenide phosphor crystals may be immersed in water saturated with hydrogen sulphide, hydrogen selenide or both, while the water is at room temperature, followed by heating to a temperature of up to 100° C. during which the mixture of the phosphor crystals in the aqueous solution is vigorously stirred. A motor-driven, paddle-type, glass stirrer has been found satisfactory for this step, the motor being shielded to protect the material from contamination. The washing with an aqueous solution of hydrogen sulphide, hydrogen selenide or both is preferably performed in the absence of actinic light to prevent the partial decomposition or photolysis of the crystallized phosphor.

As far as I know, the only free-flowing non-flocculent sulphides and selenides heretofore produced had the individual crystals or particles coated with an inert material, such as alumina, silica or sulphur. My process produces a superior free-flowing and non-flocculent luminescent material free from inert material. Therefore, when I refer in the claims to a free-flowing non-flocculent material consisting of a sulphide or selenide, I mean a material which has no coating of inert material, such as alumina, silica, sulphur or other inert matter such as decomposition products of the phosphor over the crystal particles. The material made in accordance with my invention consequently consists only of the sulphide, sulpho-selenide, selenide or seleno-sulphide without the inert layer which in prior materials always characterized these phosphors when of a free-flowing non-flocculent character. Sulphides, sulpho-selenides, selenides and seleno-sulphides made in accordance with my invention are so free-flowing and non-flocculent that the material may be poured through a funnel having an opening which at the most is ten times the diameter of the largest individual crystals over a size range from one millimeter down to the smallest crystals producible. Flocculent materials, however, retain the shape of the container from which they might be poured, and upon inverting the container the flocculent material contained therein may not flow even through an orifice one inch in diameter, even when the particles of the flocculent material are very loosely packed. The minimum diameter of the orifice must be from fifty to one hundred times the diameter of the largest individual particles of a flocculating material to allow the material to flow through, and even with such a large orifice and a minimum of packing the flow is often interrupted by the formation of aggregates.

Another test to determine the non-flocculent and free-flowing properties of my new material is to deposit the material on a smooth surface in the form of a fine stream, allowing the material to build up on the surface in the form of a cone. Materials made in accordance with my invention are so free-flowing that the cone is smooth substantially within the dimensions of the individual particles, whereas materials without a coating of inert material, such as alumina, silica or sulphur, and not made in accordance with my invention, when tested in this manner provide a cone which is rubbly and uneven, such surface unevennesses being larger than 50 times the individual particle diameters. Thus when I refer to a free-flowing non-flocculent luminescent material, I am referring to a material which has the property of flowing when a surface of a mass of the material is subjected to an inclination of 80 degrees from the horizontal and to a material which, when deposited as a fine stream, provides a smooth cone as above stated.

While I do not wish to be limited to any particular theory to explain the higher-efficiency, free-flowing and non-flocculating properties of my phosphor, it appears that when a sulphide or similar compound is washed in pure water, reversible dissociation occurs, causing the outer portions of the high-temperature crystallized crystals to be converted into ions in solution, a portion of which at any instant of time are depositing on the crystals as an amorphous or semi-amorphous compound. Depending on the concentration of the hydrogen sulphide or selenide in the washing water, the normal quantity of zinc or other metal constituent of the phosphor dissociating from the phosphor may be reduced to as little as one ten-thousandth of that normally occurring in pure water, thereby retarding and substantially preventing the formation of a layer of inert material on the phosphor crystals to one-thousandth of the normal rate of such formation.

While I have disclosed and specifically set forth my new steps in the preparation of my improved phosphor material, it will be appreciated that various modifications of the steps and the processes above disclosed may be made without departing from the spirit of my invention and the scope of the appended claims.

I claim:

1. The method of making phosphor crystals which consists in heating to its crystallizing temperature a mixture of a compound of a metal selected from the group consisting of zinc, and cadmium and mixtures thereof and an element selected from the group consisting of sulphur and selenium and mixtures thereof, an activator for said compound and a flux for the heated compound soluble in a hot aqueous solution of a compound of hydrogen and said element, cooling the mixture and alternately washing it with hot distilled water and said hot aqueous solution to eliminate the flux and prevent contamination of the phosphor crystals with a precipitate not crystallized by said heating.

2. The method of making phosphor crystals which consists in heating to crystallizing temperature a mixture of a compound of a metal selected from the group consisting of zinc, and cadmium and mixtures thereof and an element selected from the group consisting of sulphur and selenium and mixtures thereof, an activator selected from the group consisting of silver and copper and mixtures thereof and a flux for the heated compound soluble in a hot aqueous solution of a compound of hydrogen and said element, cooling the mixture and alternately washing it with hot distilled water and said hot aqueous solution to eliminate the flux and prevent contamination of the phosphor crystals with a precipitate not crystallized by said heating.

3. The method of making phosphor crystals which consists in heating to crystallizing temperature a mixture of zinc sulphide, an activator and a flux for said zinc sulphide soluble in a hot aqueous solution of hydrogen sulphide, cooling the mixture and alternately washing it with hot distilled water and said hot aqueous solution to eliminate the flux and prevent contamination of the phosphor crystals with a precipitate not crystallized by said heating.

4. The method of making phosphor crystals which consists in heating to crystallizing temperature a mixture of cadmium sulphide, an activator and a flux for said cadmium sulphide soluble in a hot aqueous solution of hydrogen sulphide, cooling the mixture and alternately washing it with hot distilled water and said hot aqueous solution to eliminate the flux and prevent contamination of the phosphor crystals with a precipitate not crystallized by said heating.

5. The method of making phosphor crystals which consists in heating to crystallizing temperature a mixture of zinc sulphide with an activator of silver and an alkali halide flux, cooling the mixture and alternately washing it with hot distilled water and a hot aqueous solution of hydrogen sulphide to eliminate the flux and prevent contamination of the phosphor crystals with a precipitate not crystallized by said heating.

HUMBOLDT W. LEVERENZ.

REFERENCES CITED

The following references are of record in the file of this patent:

UNITED STATES PATENTS

| Number | Name | Date |
| --- | --- | --- |
| 1,622,379 | Guntz | Mar. 29, 1927 |
| 2,126,233 | Wakenhut | Aug. 9, 1938 |
| 2,218,750 | Hinderer | Oct. 22, 1940 |
| 2,220,894 | Einig | Nov. 12, 1940 |
| 2,117,858 | Schleede | May 17, 1938 |

FOREIGN PATENTS

| Number | Country | Date |
| --- | --- | --- |
| 501,707 | Great Britain | Mar. 3, 1939 |

OTHER REFERENCES

Standard Methods of Chemical Analysis by Scott, D. Van Nostrand Co., N. Y., 1925, vol. I, pg. 182.